United States Patent [19]

Mitch

[11] Patent Number: 4,818,263
[45] Date of Patent: Apr. 4, 1989

[54] METHOD AND APPARATUS FOR PRECISELY POSITIONING MICROLENSES ON OPTICAL FIBERS

[75] Inventor: John H. Mitch, Portland, Oreg.

[73] Assignee: Tektronix, Inc., Beaverton, Oreg.

[21] Appl. No.: 62,308

[22] Filed: Jun. 11, 1987

[51] Int. Cl.$^4$ .................... C03B 37/027; C03B 11/08
[52] U.S. Cl. .................................... 65/2; 65/3.11;
  65/37; 65/39; 65/63; 65/65; 65/102; 65/142;
  264/1.5; 350/96.15
[58] Field of Search ................ 65/2, 3, 11, 3.12, 37,
  65/36, 39, 61, 65, 63, 64, 11.1, 12, 102, 21.5,
  142, 143; 264/1.5; 350/96.15

[56] References Cited

U.S. PATENT DOCUMENTS

| | | | |
|---|---|---|---|
| 197,869 | 12/1877 | Lehmann | 65/21.5 X |
| 3,186,134 | 6/1965 | Bonin | 51/283 |
| 3,724,924 | 4/1973 | Lenfant et al. | 65/37 X |
| 4,076,937 | 1/1978 | Unno et al. | 65/37 X |
| 4,137,060 | 1/1979 | Timmermann | 65/37 X |
| 4,143,940 | 3/1979 | Khoe | 350/96.15 |
| 4,243,399 | 1/1981 | Khoe et al. | 65/37 X |
| 4,338,352 | 7/1982 | Bear et al. | 427/8 |
| 4,418,500 | 12/1983 | Dholakia et al. | 51/125.5 |
| 4,661,236 | 4/1987 | Gelo et al. | 65/36 X |

OTHER PUBLICATIONS

Giok-Djan Khoe et al, Progress in Monomode Optical-Fiber Interconnection Devices (Journal of Lightwave Technology), Jun. 1984, pp. 217-227.
Kyung S. Lee et al, Microlenses on the End of Single-Mode Optical Fibers for Laser Applications (Applied Optics), Oct. 1, 1985, pp. 3134-3139.
Jun-ichi Yamada et al, Characteristics of a Hemispherical Microlens for Coupling Between a Semiconductor Laser and Single-Mode Fiber (IEEE), Oct. 1980, pp. 1067-1072.
Kenji Kawano et al, Combination Lens Method for Coupling a Laser Diode to a Single-Mode Fiber (Applied Optics), Apr. 1, 1985, pp. 984-989.

Primary Examiner—Robert L. Lindsay
Attorney, Agent, or Firm—William S. Lovell; William Y. Conwell

[57] ABSTRACT

A microlens is precisely positioned on the end of an optical fiber by urging the fiber against a moving abrasive lap at a desired angle and simultaneously turning the fiber end, either continuously or in discrete steps. The turning causes the fiber end to contact the abrasive at points all around its periphery, thereby removing material equally from all sides of the fiber and producing a precise lens form. The pressure with which the fiber end is urged against the abrasive is maintained substantially constant by spring action of the fiber. The resulting conical lens is centered on the fiber by action of friction forces which constrain the fiber to rotate in a fixed position despite the fiber's freedom of movement within a guide tube. The invention repeatably provides optically accurate lenses of a variety of conifurgations centered to within one micron on fibers of all types, including polarization-preserving fibers.

20 Claims, 4 Drawing Sheets

FIG. 9
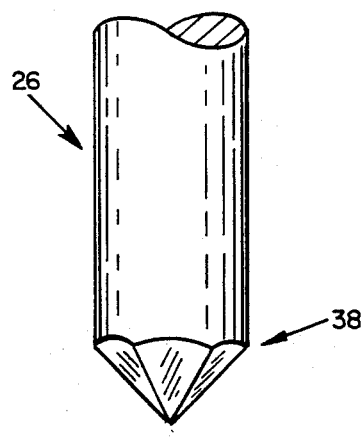
FIG. 12
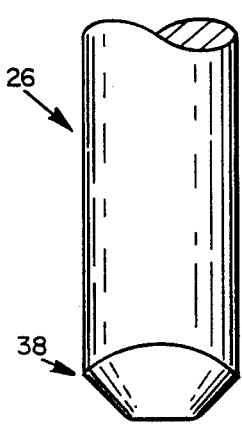
FIG. 13
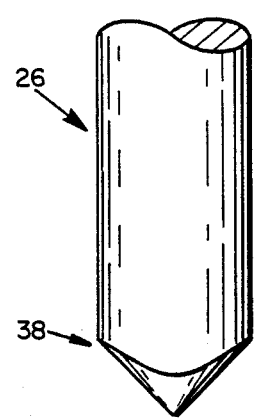
FIG. 10
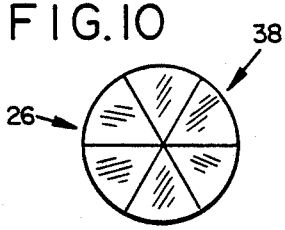
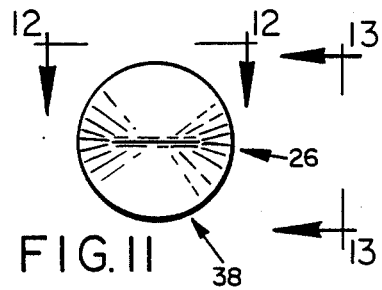
FIG. 11

METHOD AND APPARATUS FOR PRECISELY POSITIONING MICROLENSES ON OPTICAL FIBERS

TECHNICAL FIELD

The present invention relates to the formation of microlenses on optical fibers, and more particularly relates to a method and apparatus for repeatably forming optically accurate, precisely centered microlenses on optical fibers of all types.

BACKGROUND AND SUMMARY OF THE INVENTION

In recent years, fiber optic technology has seen increasing uses in a variety of widely diverse fields. The use of this technology in many fields requires that the coupling efficiency of the fiber, i.e. the ability to gather light directed at the fiber end, be as high as possible. With simple butt coupling techniques, less than one percent of the energy emitted from a light emitting diode can be launched into a single mode fiber. With a laser diode source, the figure is approximately ten percent. The reason for this poor performance is the modal mismatch at the fiber end. With a lens attached to the fiber end, however, these coupling efficiencies can be improved dramatically. These improvements lead to commensurate improvements in transmission distance and signal-to-noise ratio.

Fiber optic technology also finds application in various medical fields, such as endoscopy and laser surgery. These applications, too, rely on the use of lenses on fiber ends, here principally for purposes of minimizing optical distortion and focusing laser energy.

Several techniques for forming lenses at optical ends have previously been reported. One class of techniques involves the attachment of a discrete lens to the fiber. An example of this technique is shown in U.S. Pat. No. 4,269,648 to Dackss et al., wherein a microsphere bead is glued to a cleaved fiber end with a transparent glue. The Dackss et al. technique is claimed to center the lens on the fiber core to within five microns. Another example of a discrete attachment technique is shown in U.S. Pat. No. 4,380,365 to Gross, wherein a microsphere bead is positioned on the end of a cleaved fiber and is melted in place. Still another example of a discrete attachment technique is shown in U.S. Pat. Nos 4,118,270 to Pan et al. and 4,067,937 to Unno et al., wherein a cleaved fiber end is dipped in molten glass or epoxy to form a hemispherical lens thereon.

A second class of techniques for providing a lens at an optical fiber end involves direct fabrication of a lens onto the fiber. This approach is generally preferable to the discrete lens attachment approach becauseit has the advantage of relative mechanical simplicity and freedom from complicated alignment procedures.

One such direct fabrication technique involves cleaving the fiber to a square edge and then etching the end of the fiber in a hydrofluoric acid solution to form a rounded lens thereon. The dimensions of the lens are a function of the concentration of the acid, the acid bath temperature and the duration of the chemical etch. An example of this technique is shown in U.S. Pat. No. 4,118,270 to Pan et al. Additional examples of the technique are discussed in the following articles: "Chemically Etched Conical Microlenses for Coupling Single-Mode Lasers Into Single-Mode Fibers," by Eisenstein et al., Applied Optics Vol. 21, pp. 3470-3474 (Oct. 1, 1982); "Improved Coupling Between Laser Diode and Single-Mode Fibre Tipped With a Chemically Etched Self-Centered Defracting Element," by Kayoun et al., Electronic Letters Vol. 17, pp. 400-402 (Aug. 9, 1985); and "Microlens Formation on VAD Single-Mode Fibre Ends," by Kawachi et al., Electronic Letters, Vol. 18, pp. 71-72 (Jan. 21, 1982).

A second technique for fabricating a microlens directly on the end of an optical fiber is to heat the fiber in an electric arc or flame and pull its ends so as to form a narrow waist. The fiber can then be cleaved at this waist or it can be heated further until the waist separates. In both cases, a long, substantially conically tapered lens results. Examples of this technique are shown in U.S. Pat. No. 4,589,897 to Mathyssek et al. and in British Patent No. 2,110,835 to Bricheno. The technique is additionally discussed in an article entitled "Efficient Coupling from Semiconductor Lasers Into Single-Mode Fibers with Tapered Hemispherical Ends," by Kuwahara et al., Applied Optics Vol 19, pp. 2578-2783 (Aug 1, 1980).

Still another technique for forming a microlens directly on a fiber end, or for rounding a microlens formed by another technique, is to heat the end of the fiber to its melting point. As the glass melts, surface tension acts to minimize the end's surface area, thereby producing a rounded surface.

A variety of common problems plague all of the above techniques, making them poorly suited for practical application. For example, common to all of these techniques is the problem of repeatability. In many applications, it is important to form identical lenses on a plurality of fibers. Such repeatability has heretofore been unattainable.

Another related common problem is that of achieving the precise lens configuration desired. Most lensing techniques can be modelled mathematically to determine the parameters necessary to achieve a lens of the desired shape. However, these parameters cannot be implemented with the degree of precision necessary to accurately obtain the desired lens. For example, the drawn taper and flame rounding techniques operate as functions of heat distribution, glass composition and, in the case of the drawn taper, the pulling force. However, these factors, particularly the heat distribution factor, cannot be sufficiently controlled to produce a lens having the precise configuration desired. Similarly, the dimensions of lenses formed by chemical etching can only be grossly controlled by the acid concentration, acid temperature and bath duration factors. In actual practice, the resulting lenses only roughly approximate the desired configuration.

This problem of deviation of lens geometry from the desired shape, or lens aberration, has been recognized as the dominant component of coupling loss in a laser-fiber junction by Sumida et al. in an article entitled "Lens Coupling of Laser Diodes to Single-Mode Fibers," Journal of Light Wave Technology Vol. 2, pp. 30514 -311 (June, 1984). Consequently, reduction of lens aberrations is a primary concern in the development of a highly efficient coupling.

Still another common problem is that of dealing with fibers having unusual geometries. Although most fibers have a circular core positioned in the center of the cladding, other fiber geometries are also used. For example, some fibers have cores that are not circular in cross section or that are not centered in the cladding.

Prior art lensing techniques are grossly unsuited for use with fibers having such properties.

Yet another common problem is that of dealing with polarization preserving fibers. Such fibers typically include regions adjacent the core that are highly doped with alumina to induce a stress in the fiber that aids in birefringence. These highly doped regions do not etch at the same rate as glass in chemical etching techniques, nor do they melt at the same temperature as glass in drawn taper techniques. This doping inhomogeneity thus interferes with the formation of lenses on these fibers by known techniques.

In addition to the common problems noted above, each of the prior art lensing techniques also has its own peculiar drawbacks. The chemical etching technique, for example, requires the use of highly reactive solutions, such as hydrofluoric acid, to etch away the glass. The use of such solutions renders the technique unsuitable for all but the most carefully controlled laboratory conditions. The technique also suffers in that only a narrow range of lens geometries can be formed thereby.

The problems peculiar to the drawn taper technique are numerous. One is the geometry of the resulting lens. In the tapered lens region, the core and cladding thicknesses both decrease. Because of this tapering, the core diameter and the light collection angle are both reduced, so the chance of light coupling into the cladding layer is increased.

Another drawback peculiar to the drawn taper technique is that different softening points in the core and cladding material may result in unevenness on the fiber surface, leading to additional scattering losses from the light source.

Still another problem of the drawn taper technique is that of lens centering. In an exemplary single mode fiber, the core may be only eight microns in diameter. Consequently, a lens must be centered on the fiber to within a small fraction of this figure if it is to operate efficiently. Such positioning precisions cannot reliably be obtained by this technique.

Yet another drawback of the drawn taper technique is that the composition of the lens formed thereby is unpredictable. The parting of the fiber at its narrow waist leaves the core surrounded by cladding at the lens end. When flamed to round the lens, this cladding material mixes with the core material so that the lens formed therefrom is of unpredictable composition.

A final drawback of the drawn taper technique is that the range of geometries attainable is limited to long tapers. The technique is thus poorly suited for applications in which a longer focal length, and thus a shorter taper is required.

In addition to the lensing techniques discussed above, all of which have found at least some measure of practical application, a multitude of other lensing techniques have been proposed but have proved entirely unworkable in practice. Exemplary of this class of techniques is mechanical polishing of lens surfaces into pyramid form, as referenced in the article by Sakaguchi entitled "Power Coupling From Laser Diodes Into Single-Mode Fibres With Quadrangular Pyramid-Shaped Hemiellipsoidal Ends," Electronic Letters, Vol. 17, pp. 425-6 (June 11, 1981). The fatal problem in this technique was apparently the requirement that the polishing apparatus be positioned and aligned relative to the fiber to within micron-order tolerances, a requirement that is unattainable in practice. The prior art is replete with other such instances of lensing techniques that are entirely unsuited for practical application.

From the foregoing it will be recognized that a long felt need still exists for a method and apparatus for providing microlenses on optical fibers which overcomes the above-noted drawbacks in the prior art. The present invention fulfills this need.

According to the present invention, an end of an optical fiber is urged against a moving abrasive lap at a desired angle and is simultaneously turned, either continuously or in discrete steps. The turning causes the fiber end to contact the abrasive at points all around its periphery, thereby removing material equally from all sides of the fiber and producing a precise, well-centered lens form. By varying the duration of contact on various surfaces, lenses of various configurations, such as conical, elliptical, pyramidal, truncated pyramidal, bevelled cleave, etc., can be obtained. Novel techniques are employed inter alia, to regulate the grinding pressure and to center the lens on the fiber.

The features and advantages of the present invention will be more readily apparent from the following detailed description of a preferred embodiment thereof, which proceeds with reference to the accompanying drawings.

BRIEF DESCRIPTION OF THE DRAWINGS

FIG. 9 is a side view of a fiber having a multi-faceted lens formed according to the present invention.

FIG. 10 is an end view of the fiber of FIG. 9;

FIG. 11 is an end view of an elliptical lens formed according to the present invention.

FIG. 12 is a side view taken along lines 12—12 of FIG. 11.

FIG. 13 is a side view taken along lines 13—13 of FIG. 11.

DETAILED DESCRIPTION

First Embodiment

Figure 2:
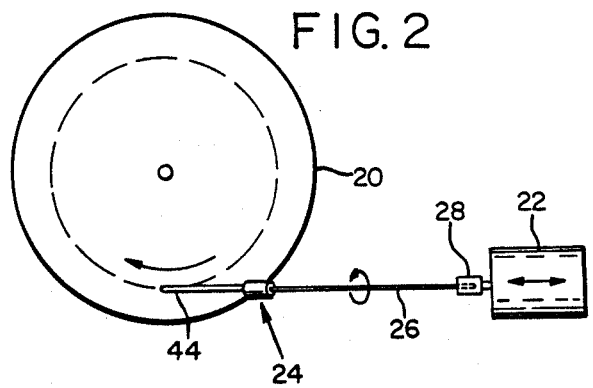
FIG. 2 is a schematic representation of the apparatus of FIG. 1.
Figure 1:
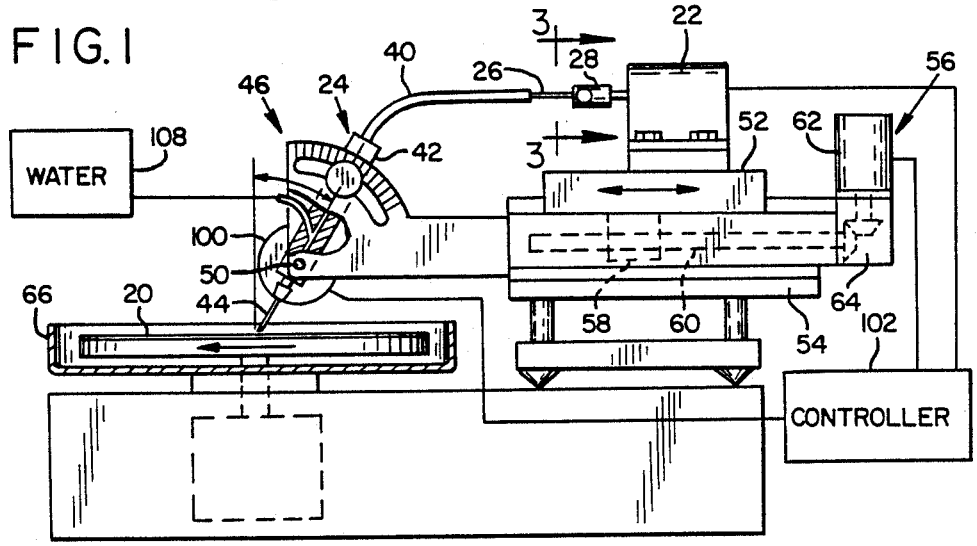
FIG. 1 is a side view of an apparatus according to the present invention.

With reference to FIGS. 1 and 2, the preferred embodiment of the present invention includes a rotating abrasive lap 20, a fiber drive motor 22, and a guide tube assembly 24 for routing an optical fiber 26 to be ground from the motor to the lap.

Figure 3:
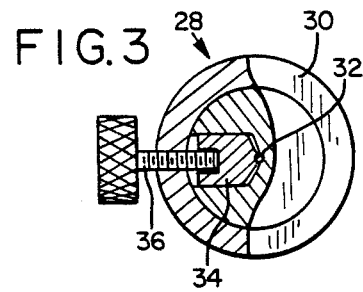
FIG. 3 is a view taken along lines 3—3 of FIG. showing, partially in section, a collet used in the apparatus of FIG. 1.

One end of optical fiber 26 is clamped in a precision collet 28 on motor 22. Collet 28 is also shown in FIG. 3 and comprises a steel disk 30 having a hole 32 centered therein. Disk 30 is adapted to receive a precision member 34 that is positioned relative to hole 32 by a bolt 36 threaded through disk 30. In use, fiber 26 is placed in hole 32 and is clamped in place by tightening of member 34 onto the fiber by bolt 36. Although illustrated collet 28 is a precisely machined component, it is not essential that the fiber be precisely centered about the axis of motor 22, so a simpler collet could readily be employed.

The end 38 of fiber 26 onto which the lens is to be formed is fed into guide tube assembly 24 and emerges adjacent lap 20. Guide tube assembly 24 includes first, second and third conduits 40, 42 and 44. First conduit 40 used in the preferred embodiment is a brass conduit having a one thirty-second inch inside diameter and serves to route the fiber from near collet 28 into second conduit 42. Second conduit 42 comprises a quarter-inch brass conduit into which first conduit 40 extends and to which third conduit 44 is coupled. Second conduit 42 is pivotally connected in a protractor assembly 46 which is used to set the desired lens grinding angle.

Figure 6:
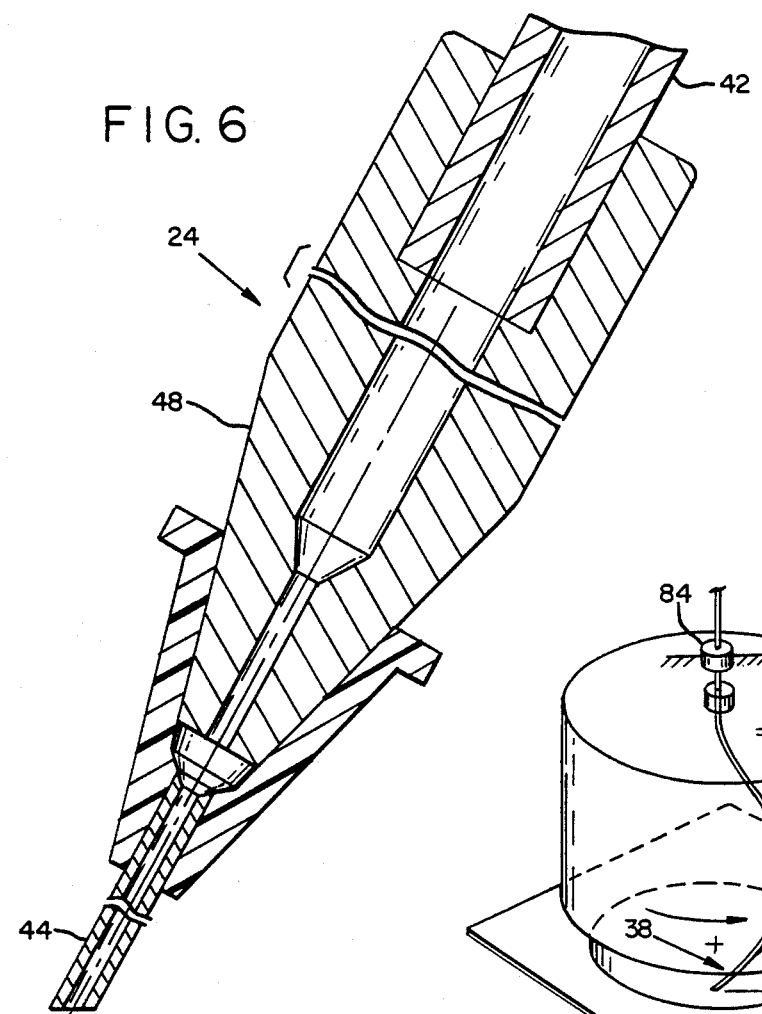
FIG. 6 is an enlarged view of a fiber guide tube assembly used in the apparatus of FIG. 1.

Third conduit 44 is typically a glass capillary or a hypodermic needle of small gauge, such as 25 or 27 gauge, and is adapted to be received on the end of second conduit 42. This coupling is desirably effected by an intermediate taper portion 48 (FIG. 6) mounted on second conduit 42, which serves to channel fiber 26 into the very narrow aperture of third conduit 44. First, second and third conduits 40, 42 and 44 all pivotally move about a pivot 50 of protractor assembly 46 when second conduit 42 is set to the desired orientation.

Fiber drive motor 22 is a small conventional motor operable, for example, at a speed of 100 rpm. Motor 22 is mounted on a first platform 52 which is movably coupled to a second platform 54 by a motor positioning system 56. Motor positioning system 56 is illustrated as being a screw positioner comprised of a nut 58 and a threaded shaft 60 driven by a positioning motor 62 through a gear assembly 64. Second platform 54 is maintained in fixed relationship to lap 20.

Abrasive lap 20 employed in the preferred embodiment comprises a Mylar substrate onto which diamonds and/or alumina beads are bound by a resin. A suitable lap is 0.5 micron or 0.1 micron Imperial Diamond Lapping Film marketed by 3M. A splash guard 66 is positioned around rotating lap 20 and catches water propelled therefrom. (The water is used, inter alia, to cool the fiber tip and rinse the lap, as discussed below).

In operation, motor 22 is started and is moved towards fiber guide assembly 24 by positioning system 56 until end portion 38 begins to contact rotating abrasive lap 20. At this point, end portion 38 has a flat, square configuration that has earlier been formed by cleaving or otherwise. As grinding progresses, the spinning action of fiber 26 on lap 20 causes all sides of the fiber to contact the lap for equal amounts of time. This action causes an equal removal of material from all sides of the fiber and results in a sharp, well-centered conical form. By using progressively finer abrasives, the lens can be polished to an arbitrarily fine finish.

Figure 4:
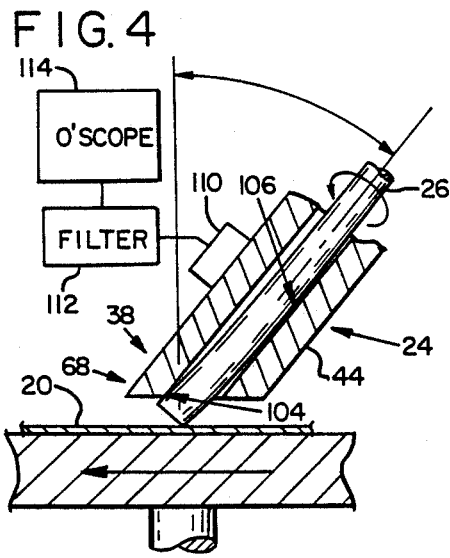
FIG. 4 is a detail showing a portion of the apparatus of FIG. 1 that includes a cleaved fiber end before it has been formed into a lens.
Figure 5:
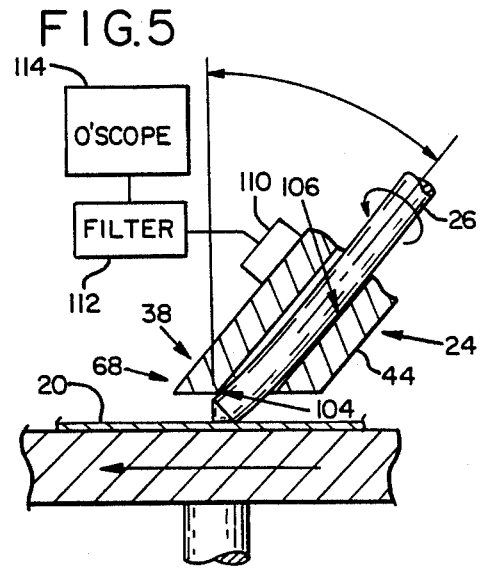
FIG. 5 is the detail of FIG. 4 after a conical lens has been formed on the fiber end.

FIGS. 4 and 5 are enlarged views of fiber 26 passing through third conduit 44 and engaging abrasive lap 20. FIG. 4 shows the fiber at the beginning of the grind, with end portion 38 still square. As the grind progresses, material is ground off end portion 38 to form the illustrated conical shape.

During the grinding operation, abrasive lap 20 is moved relative to fiber 26 colinearly with the projection of the axis of its end portion onto the lap and in a direction away from the fiber, as illustrated in FIGS. 1 and 2. This orientation is preferred because all grind marks left on the tip extend radially from its center, thereby minimizing optical aberrations. Most other orientations of fiber 26 during grinding would result in concentric scratches on the tip which are usually undesirable. The abrasive lap is desirably not operated in a direction towards the fiber because such movement would tend to push the fiber up into third conduit 44 and would defeat the self-centering feature discussed below.

Althugh third conduit 44 is quite small, there is still a finite gap between fiber 26 and the inner wall of this conduit. As lap 20 rotates, typically at a rotational speed to 500 to 1000 rpm, end 38 of fiber 26 is swept to one side 68 of the conduit by frictional forces exerted on the tip. This sweeping action self centers the resulting lens by constraining the fiber to rotate at a fixed position. Thus, in the present invention, none of the components need to be machined to within very tight tolerances in order to insure proper centering of the lenses. Instead, some play between fiber 26 and third conduit 44 is entirely acceptable, as its effect is eliminated automatically.

Despite the fact that optical fibers are quite small in diameter, they are quite stiff to torsional loads. This permits the tip being ground to be rotated by application of torque to the remote end of the fiber, while still providing smooth and constant motion at the tip. Care should be taken, however, that the fiber not be given such freedom of movement between collet 28 and first conduit 40 that the torque acts to move the free portion rather than turn the fiber tip.

The glass of which optical fiber 26 is comprised also has a low modulus of elasticity. Consequently, if fiber 26 extending from collet 28 to lap 20 is oriented in a perfectly straight line, it offers little spring action. In this configuration, the pressure with which fiber tip 38 is urged against lap 20 can vary from nil to hundreds of pounds per square inch as motor 22 is moved even a few microns. Consequently, motor 22 must be moved continuously and precisely if anything approaching a constant pressure is to be attained. This criticality in motor position is tolerable if the pressure is somehow regulated automatically, such as by using feedback controlled piezoelectric positioners. More desirable, however, is to use a spring-based system to regulate grinding pressure.

One spring-based system interposes an elastic material somewhere between fiber tip 38 and second platform 54, such as by making collet 28 of rubber. A second spring-based system is the arrangement illustrated, wherein the fiber is bent somewhere between collet 28 and lap 20 and is provided some limited freedom of movement. The reaction force exerted by the fiber in trying to straighten appears at end 38 and urges the fiber tip against the abrasive lap with a substantially constant force, much like a slightly compressed spring. This constant force yields a substantially constant material removal rate and also aids in the self-centering of the lens formed on the fiber. The reaction force remains substantially constant throughout the grinding process since the length and bend of the fiber do not change appreciably. In such spring-based systems, motor 22 need not be moved continuously with the grinding of the fiber in order to maintain a desired grinding pressure on tip 38.

Figure 14:
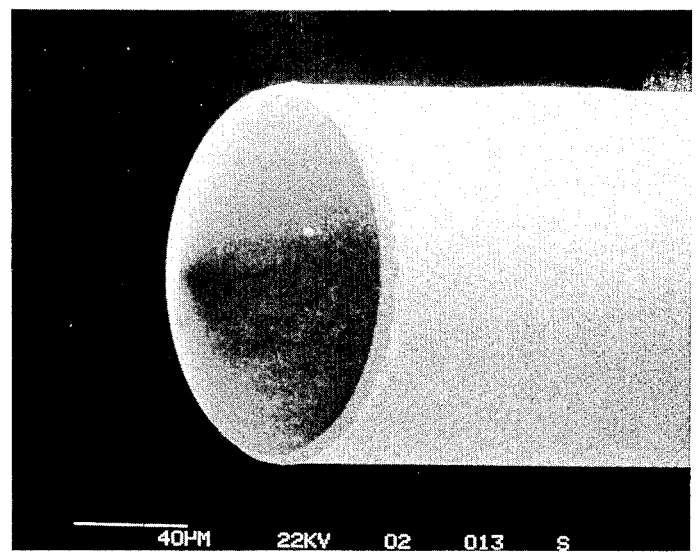
FIG. 14 is a perspective view scanning electron photomicrograph of a lens manufactured according to the present invention.
Figure 15:
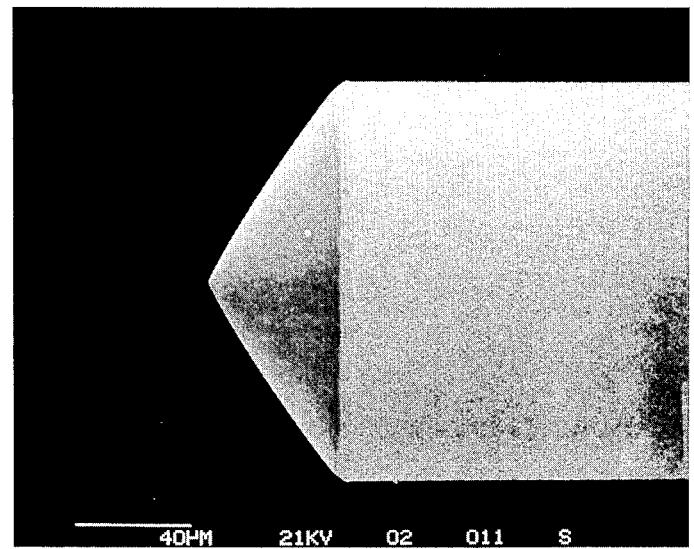
FIG. 15 is a side view scanning electron photomicrograph of the lens of FIG. 14.

To illustrate the quality of lenses produced by the present invention, FIGS. 14 and 15 are scanning electron micrographs showing a multimode fiber ground using the FIG. 1 apparatus. As can be seen, the resulting lens is free of surface irregularities and is precisely centered on the fiber. (The object on the fiber tip is an extraneous particle and is not a part of the fiber).

A forty-eight position stepper motor was employed for motor 22 in the system that ground the pictured fiber, but the motor was not paused between steps, so no discrete facets appear. The slight rounding of the lens surface evidences the swept position in which the fiber was ground. During grinding, the sweeping of fiber 26 to one side of third conduit 44 (as shown in FIGS. 4 and 5) caused the fiber to bend slightly within the conduit and caused the actual grinding angle of the fiber to be slightly greater than the grinding angle nominally defined by the central axis of the third conduit. When, however, the fiber was removed from the lap by withdrawing it up conduit 44, the frictional force exerted on the fiber that caused it to be swept in this manner was reduced to zero. In so doing, the grinding angle of the fiber changed until, when the fiber finally disengaged the lap, it equaled the grinding angle nominally defined by the conduit. This slight change in the grinding angle as the fiber was withdrawn from the lap produced the slight curvature in the lens.

This curvature can be employed advantageously, since a lens so formed more closely approximates a hemispherical surface than does a perfect cone. The effect can be exaggerated by allowing more fiber to protrude from beneath third conduit 44 so it can be swept further from the grinding angle nominally defined thereby. The effect can be still further exaggerated by withdrawing the fiber at a slow rate from the lap, so that the effect of this terminal grind will be more pronounced. Conversely, the curved effect can be minimized by minimizing the length of fiber allowed to protrude from beneath conduit 44 and by withdrawing the fiber quickly from the lap when the grinding is completed.

Second Embodiment

Figure 7:
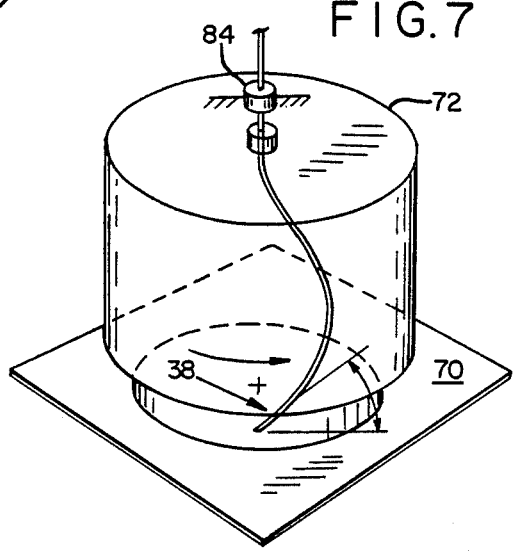
FIG. 7 is a schematic representation of an alternative embodiment of the present invention.
Figure 8:
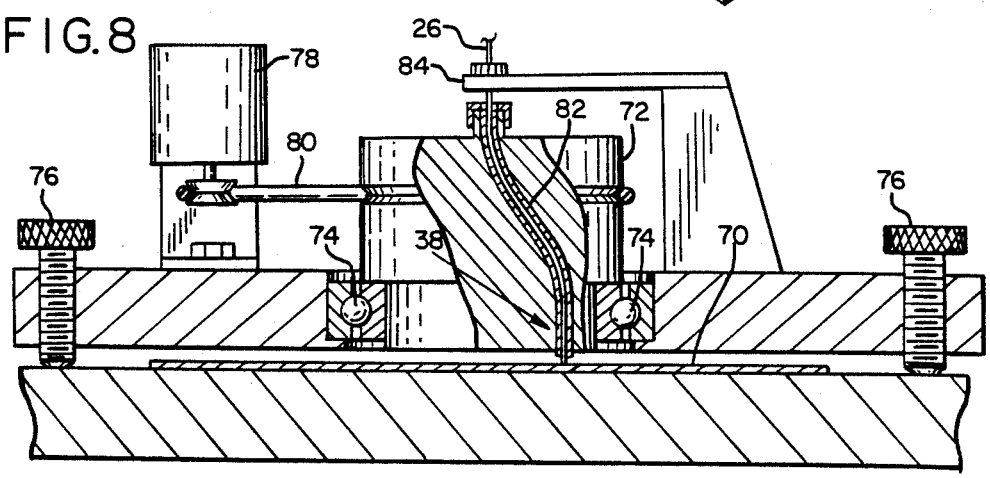
FIG. 8 is a side view, partially in section, of the apparatus schematically illustrated in FIG. 7.

In a second embodiment of the present invention, shown in FIGS. 7 and 8, a lap 70 is held stationary and fiber 26 is caused to travel a circular path on the lap. In such embodiment, a cylindrical assembly 72 is positioned for rotational movement above lap 70 on bearings 74. Bolts 76 fix the distance from the cylindrical assembly to the lap and serve to level the assembly. A motor 78 is coupled, by means such as a belt drive assembly 80, to cylindrical assembly 72 and causes it to rotate. A fiber guide tube 82 within cylindrical assembly 72 routes the fiber from the axis of the cylinder to a radially displaced point adjacent the lap. A small degree of fiber freedom in guide tube 82 provides the spring action referenced earlier which aids in regulation of grinding pressure and centering of the lens.

Fiber 26 is clamped independently of cylindrical assembly 72 by a clamp assembly 84 and is not allowed to rotate, per se. However, as the cylinder turns, the end of the clamped fiber also turns to relieve torsional stress induced in the fiber by the constant change in the direction the clamped fiber is bent. The grinding angle with which the fiber engages the lap, however, remains constant throughout the cylinder's rotation. As the fiber tip rotates, it meets the abrasive at all angles from 0 to 360 degrees, again grinding the fiber equally about its periphery and resulting in very uniform material removal.

Alternative Embodiments

It will be apparent to those skilled in the art that numerous variations on the above-described embodiments can be employed advantageously to form alternative embodiments. A few such alternative embodiments are discussed below.

In one alternative embodiment, abrasives having curved surfaces or grooves, rather than the planar laps illustrated, can be employed. By such systems, lenses having virtually any desired surface of rotation can be formed.

In another alternative embodiment, motor 22 can be a DC stepper motor that pauses at discrete angular positions during the grinding operation, thereby forming a faceted lens such as is illustrated in FIGS. 9 and 10.

In still another alternative embodiment, means can be provided to adjust automatically the fiber grinding angle. Such means can comprise a DC stepper motor 100 (FIG. 1) connected to angularly move second conduit 42 in protractor assembly 46. A programmable electronic controller 102 can be employed to control motor 100 so as to change the fiber grinding angle according to a predetermined sequence. Lenses having a plurality of differently angled surfaces can thereby readily be formed.

In yet other alternative embodiments, the invention can be adapted to produce irregularly-shaped lenses, such as ellipsoidal lenses. Ellipsoidal lenses are particularly advantageous in coupling to laser diodes due to their more or less elliptical emission. A properly shaped ellipsoidal lens can couple more light from a laser into a fiber than can any spherical lens.

To form an elliptical lens, the fiber is not ground evenly about its periphery. Instead, more material is removed from the sides of the fiber sides of the fiber corresponding to the ellipse's major axis, as shown in FIGS. 11-13. This uneven grinding can be effected in a number of ways.

One way to effect such uneven grinding is to modulate the grinding pressure in synchrony with the fiber's rotational position. This can be accomplished in the FIG. 1 embodiment by periodically moving motor 22 slightly towards and then away from lap 20. As motor 22 moves towards lap 20, the spring force in fiber 26 is increased, thereby increasing the grinding pressure. Similarly, as motor 22 moves away from lap 20, the grinding pressure decreases. This reciprocal motion can be effected by using a reversible stepper motor for positioning motor 62 and controlling this motor by controller 102. Operation of the stepper motor by controller 102 must, of course, be synchronized to rotation of the fiber if the increased grinding pressure is to be applied reliably to the same portions of the fiber each fiber revolution.

A second way to effect uneven fiber grinding is to modulate the lengths of time different portions of fiber tip 38 are ground. In the FIG. 1 embodiment, fiber drive motor 22 can be a stepper motor programmed to dwell longer at certain angular positions than others. The positions at which the motor dwells longest will cause the portion of the fiber then being ground to be ground longer, thereby forming the minor axis of the ellipse.

A similar technique can be applied to the FIGS. 3-4 embodiment by making cylindrical assembly 72 ellipsoidal in cross section and providing a central axis about which it can rotate. In such embodiment, the assembly is still rotated by a drive belt operated at a fixed speed, but an additional belt tensioning device must be used to keep the belt taut throughout the ellipsoidal assembly's rotation. Because of the assembly's ellipsoidal shape, it will not rotate at a constant angular velocity, but will instead rotate at an instantaneous rate related to its angular position. Although fiber 26 will still follow a circular path (since the distance from the fiber tip to the central axis is fixed), the rate at which its tip rotates on the lap will vary with the assembly's periodic motion. The sides of the fiber tip being ground when the tip is rotating slowly will be ground longer than those sides being ground when the tip is rotating quickly, thereby producing an ellipsoidal lens. In this alternative embodiment, it is desirable to rotate the lap, such as is done in FIGS. 1-2, so that the rate at which the fiber is ground is substantially independent of the irregular angular speed of the ellipsoidal assembly.

In still another alternative embodiment, the features of the previous two embodiments can be combined. That is, means can be provided for grinding the fiber tip unevenly about its periphery and additional means can be provided for changing the grinding angle. Such an embodiment can, for example, use a first stepper motor for motor 22 in FIGS. 1 and 2 and can use a second stepper motor 100 for moving second conduit 42 in protractor assembly 46. Such a composite system provides total flexibility in grinding parameters and, by use of programmable controller 102, can produce lenses of virtually any convex configuration.

In still another alternative embodiment, lenses positioned away from the central axis of the fiber can be formed. This can be accomplished by varying the grinding pressure so that diametrically opposite points on the tip are ground with differing grinding pressures or for differing lengths of time. This asymmetrical grinding can be effected by any of the techniques discussed above in connection with ellipsoidal lenses and can also be induced by any of a variety of other peturbations in the system.

In yet another alternative embodiment, the frictional wear on the sides of fiber 26 as it rotates in third conduit 44 can be minimized. As fiber 26 rotates, it bears against two regions of conduit 44. One is a region 104 (FIGS. 4, 5) against which fiber end 38 is swept and the second is a region 106 on the opposite side of the conduit diplaced upwardly from the fiber end. Although the inside of conduit 44 is quite smooth, scanning electron micrographs of the sides of the fiber in these regions show some abrasion. This abrasion can be eliminated by a water bearing positioned between the conduit and the fiber. The water bearing can be formed by forcing pressurized water from a pressurized water source 108 (FIG. 1) down through the gap between these elements. In still alternative embodiments, a pressurized gas can be employed.

In addition to forming a low friction bearing, such bearing liquid also serves to flush from the inside of third conduit 44 any abrasive diamond grit that may accidentally become lodged there. This continual flushing of the conduit channel minimizes the risk of cross contamination between laps of different abrasivenesses. As still a further advantage, this liquid serves to clean the abrasive lap and cool the fiber end being ground.

In still another alternative embodiment, the grinding process can be monitored electronically. As fiber 26 is ground it vibrates, emitting a changing spectrum of sounds. When the grind just begins, only a small portion of the fiber engages the lap, namely points on the circle that defines the periphery of the cleaved end. Since the surface area being ground is small, a correspondingly high grinding pressure results. The sounds emitted from the fiber at this stage of grinding differ radically from the sounds emitted at the conclusion of grinding, when entire sides of the cone engage the lap and the grinding pressure is relatively low.

These sounds produced during grinding can be monitored by a contact microphone 110 (FIG. 5) or other transducer connected to third conduit 44. The resulting electronic signals can be filtered by filter circuit 112 to remove the principal time-invariant spectral components, such as the various motor noises. The filtered sounds can then be displayed on an oscilloscope or spectrum analyzer 114 and monitored. As grinding progresses, the spectrum of grinding sounds changes. When, in a conical grind, the spectrum of grinding sounds stops changing, it can be deduced that no further changes in the shape of the lens are being made, so the grinding operation can be stopped.

If oscilloscope 114 is synchronized to the rotation of fiber tip 38, anomalies in tip geometry can be detected and located. For example, a chip in the periphery of a cleaved fiber will produce a characteristic transient on the oscilloscope every time it is rotated over the lap. Similarly, if oscilloscope 114 is synchronized to the rotation of lap 20, anomalies in the lap surface can be detected and located. For example, if the lap surface is irregular or if it has been contaminated by a grit of a larger coarseness, such irregularities will produce cyclical variations in the spectrum of sounds detected by microphone 110.

This electronic monitoring technique is well suited for application in fully automatic lensing apparatuses, in which an electronic controller serves the spectral monitoring function and stops the grinding when the lens is complete, or signals a warning if an irregularity is detected.

In still another alternative embodiment, additional processing of the lens after the grinding operation is completed can be employed. For example, the resulting lens can be further processed by melting to modify its geometry. This melting action can be adjusted to produce a very polished lens with very little deformation of the original shape or, by applying more heat, all of the core material at the fiber tip can be melted. This allows surface tension to form highly polished hemispherical lenses of a variety of focal lengths. The angle of the grind allows different volumes of core glass to be subjected to the melting action.

The fiber lens tip can also be "spoiled" by a final polishing stepusing a soft polishing lap and certain polishing compounds. The soft polishing lap "wraps" around the sharp point at the center of the core and quickly polishes the tip into a hemispherical shape.

Performance

From the foregoing, it will be recognized that the present invention eliminates many drawbacks found in the prior art. For example, the process is accurately repeatable. Once a desired lens configuration is chosen, any number of virtually identical lenses having that precise configuration can readily be formed. Similarly, as is illustrated by FIGS. 14 and 15, the lenses are virtually free from aberrations. The invention thus overcomes this common problem that Sumida characterized as the most important obstacle to improving coupling efficiencies.

The present invention is also entirely adjustable and can provide lenses having any desired grind angle and consequently any desired focal length. Furthermore, the system works well with polarization-preserving fibers. As noted, these fibers cannot be readily lensed using known lensing techniques due to the use of highly doped stress-inducing regions adjacent their cores. The method and apparatus of the present invention, however, can cope with such unusual fibers without modification. Finally, the invention overcomes the centering problem found in the prior art, precisely centering the resultant lens to submicron dimensions without requiring any precision fiber aligning or positioning components.

While the present invention overcomes these prior art problems, it is not, as are some proposed panaceas, unsuited for practical application. To the contrary, the invention is well suited for a wide range of practical applications in the laboratory, factory and field.

Having described and illustrated the principles of my invention in a preferred embodiment and several variations thereof, it should be apparent to those skilled in the art that the invention can be further modified in arrangement and detail without departing from such princples. Accordingly, I claim as my invention all modifications coming within the scope and spirit of the following claims and equivalents thereof.

I claim:

1. A method for providing a microlens on the end of an optical fiber comprising the steps:
    providing an abrasive surface;
    positioning the optical fiber so that the axis of the end portion thereof defines a desired angle with the abrasive surface;
    effecting relative movement between the end portion of the fiber and the abrasive surface; and
    providing a spring means for urging the end portion of the fiber against the abrasive surface.

2. The method of claim 1 in which the providing a spring means step comprises bending the optical fiber and allowing said fiber some freedom of movement.

3. The method of claim 1 which further comprises the step periodically changing the force with which the end portion of the fiber is urged against the abrasive surface.

4. The method of claim 1 which further comprises the step changing the angle defined between the abrasive surface and the axis of the end portion of the fiber.

5. The method of claim 1 which further comprises the step turning the end portion of the optical fiber.

6. An optical fiber having a microlens made by the method of claim 1.

7. A method for precisely positioning a microlens on the end of an optical fiber comprising the
    providing an abrasive surface;
    positioning the optical fiber so that the axis of the end portion thereof defines a desired angle with the abrasive surface;
    effecting relative movement between the end portion of the fiber and the abrasive surface while maintaining said desired angle; and
    turning the end portion of the optical fiber while maintaining said desired angle.

8. The method of claim 7 in which the turning step is effected without rotating portions of the fiber remote from said end portion.

9. The method of claim 7 in which the turning step includes transmitting torque to the end of the fiber from a portion of said fiber remote from said end.

10. The method of claim 7 in which the turning step includes turning the end portion of the fiber at a time-varying rate.

11. The method of claim 7 in which the movement of the abrasive surface relative to the fiber is colinear with the projection of the axis of the end portion of the fiber onto the abrasive surface and in a direction away from the fiber.

12. A method for precisely positioning a microlens on the end of an optical fiber comprising the steps:
    providing an abrasive surface;
    providing a fiber guide means sized larger than the fiber so the fiber can pass therethrough;
    positioning the fiber in the fiber guide means;
    positioning the fiber guide means so that the end of the fiber passing therethrough engages the abrasive surface;
    turning the end portion of the fiber;
    effecting relative movement between the turning end portion of the fiber and the abrasive surface; and
    sweeping the turning end portion of the fiber within the fiber guide means so that the fiber is constrained to turn at a fixed location, thereby precisely centering the resultant lens despite loose fitting of the fiber within the fiber guide means.

13. An optical fiber having a microlens made by the method of claim 12.

14. An apparatus for precisely positioning a microlens on the end of an optical fiber comprising:
    an abrasive surface;
    clamp means for securely coupling to the fiber;
    guide means for routing the fiber from the clamp means to the abrasive surface, said guide means allowing the fiber some freedom of movement between the clamp means and the abrasive surface;
    motion means for effecting relative movement between the abrasive surface and the end of the fiber; and
    rotation means for changing the surface of the optical fiber engaged with the abrasive surface.

15. The apparatus of claim 14 in which the clamp means comprises a collet coupling the fiber to the rotation means.

16. The apparatus of claim 14 in which the clamp means, the guide means, the pressure means, the motion means and the rotation means comprise, in combination, a rotating body defining a fiber guide path terminating adjacent the abrasive surface and means for securing the fiber fixedly apart from said rotating body.

17. The apparatus of claim 14 in which the guide means comprises a conduit through which the fiber is threaded, the apparatus further comprising means for forcing a fluid through a gap defined between the fiber and the conduit.

18. In an apparatus for machining an article not readily susceptible to visual observation, the improvement comprising monitoring means for monitoring electronically the acoustic energy emitted by the machining operation.

19. The invention of claim 18 in which the machining operation involves periodic motion of the apparatus or the article being machined and in which the monitoring means includes means for synchronizing said electronic monitoring function with the frequency of said periodic motion.

20. The invention of claim 18 in which the machining operation comprises polishing a lens surface on an end of an optical fiber.

* * * * *